(12) United States Patent
Nishida et al.

(10) Patent No.: US 6,884,495 B2
(45) Date of Patent: Apr. 26, 2005

(54) ANTIREFLECTION FILM

(75) Inventors: Mitsuhiro Nishida, Tokyo (JP); Shingo Ohno, Tokyo (JP); Masato Yoshikawa, Tokyo (JP); Nobuko Kato, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 6 days.

(21) Appl. No.: 09/837,618

(22) Filed: Apr. 19, 2001

(65) Prior Publication Data

US 2001/0053438 A1 Dec. 20, 2001

(30) Foreign Application Priority Data

| May 2, 2000 | (JP) | ........................................ | 2000-133668 |
| Jun. 7, 2000 | (JP) | ........................................ | 2000-170841 |

(51) Int. Cl.$^7$ .......................... B32B 25/10; B32B 3/26; B32B 9/00; B32B 5/16; C09K 19/00
(52) U.S. Cl. ................. 428/212; 428/297.1; 428/315.9; 428/304.4; 428/1.5; 428/1.51; 428/323; 428/697; 428/702
(58) Field of Search .............................. 428/195, 297.1, 428/315.9, 304.4, 1.5, 1.51, 323, 212, 697, 702; 359/582

(56) References Cited

U.S. PATENT DOCUMENTS 4,687,707 A    8/1987   Matsuo et al.
6,177,131 B1 * 1/2001   Glaubitt et al. ............. 427/162
6,335,832 B1 * 1/2002   Oka et al. .................... 359/580

FOREIGN PATENT DOCUMENTS

EP    0 359 026    3/1990

OTHER PUBLICATIONS

Patent Abstracts of Japan; Publication No. 59204801; Publication date Nov. 20, 1984; Applicant Konishiroku Photo Ind. Co Ltd.

* cited by examiner

*Primary Examiner*—Rena Dye
*Assistant Examiner*—Lawrence Ferguson
(74) *Attorney, Agent, or Firm*—Manabu Kanesaka

(57) ABSTRACT

An antireflection film is formed of an organic film, a hard hard coating layer on the organic film, a first layer coated on the hard coating layer, and a second layer having an index of refraction lower than that of the first layer and coated on the first layer. The first layer is formed of a synthetic resin having pores therein and metallic oxide particles contained in the synthetic resin. The metallic oxide is at least on selected from the group consisting of $ZrO_1$, $TiO_2$, NbO, ITO, ATO, $SbO_2$, $In_2O_3$, $SnO_2$ and ZnO. The synthetic resin is ultraviolet ray curable resin or electron beam curable resin. The second layer partly enters the pores of the first layer to firmly bond to the first layer through the pores.

10 Claims, 1 Drawing Sheet

ANTIREFLECTION FILM

FIELD OF THE INVENTION AND RELATED ART STATEMENT

The present invention relates to an antireflection film.

As for a PDP (a plasma display panel) or a liquid crystal plate of an office automation apparatus, or windows of a vehicle or a special building, an antireflection film is used in order to ensure high luminous transmittance by preventing optical reflection.

One method to produce the antireflection film is to laminate a film with an inorganic thin film by sputtering or evaporation and the other is to coat a film with coating liquid. In the coating method, an organic thin film of fluorocarbon polymers or silicone is often used for a surface layer.

OBJECT AND SUMMARY OF THE INVENTION

It is an object of the present invention to provide an antireflection film that has a good property of preventing reflection.

An antireflection film of a first aspect comprises an organic film, a hard coating layer, a layer having high index of refraction, and a surface layer made of organic resin which has excellent marring resistance and chemical resistance. These layers are laminated on the organic film in that order, and these layers are composed of synthetic resin thin film.

The layer composed of the synthetic resin film is much less expensive and formed easily compared with an inorganic thin film. The surface layer made of organic resin having excellent marring or scuffing resistance and chemical resistance is composed of the synthetic resin thin film and tends to have a little higher index of refraction than an inorganic thin film. However, the sufficient property of preventing reflection can be obtained by increasing the index of refraction of the layer having high index of refraction.

An antireflection film of a second aspect comprises an organic film, a hard coating layer, a layer having high index of refraction, and a layer having low index of refraction, wherein these layers are laminated on the organic film in that order. The layer having high index of refraction is composed of synthetic resin thin film including minute particles of one or more kinds of metallic oxide chosen among $ZrO_2$, $TiO_2$, NbO, ITO, ATO, $SbO_2$, $In_2O_3$, $SnO_2$, and ZnO. The synthetic resin is ultraviolet ray curable resin or electron beam curable resin.

The layer composed of the synthetic resin thin film is much less expensive and formed easily compared with an inorganic thin film. The layer having low index of refraction composed of the synthetic resin thin film tends to have a little higher index of refraction than an inorganic thin film. However, the sufficient property of preventing reflection can be obtained by increasing the index of refraction of the layer having high index of refraction.

DETAILED DESCRIPTION OF PREFERRED EMBODIMENTS

Hereinafter, preferred embodiments of the present invention will be described with reference to attached drawings.

Figure 1:
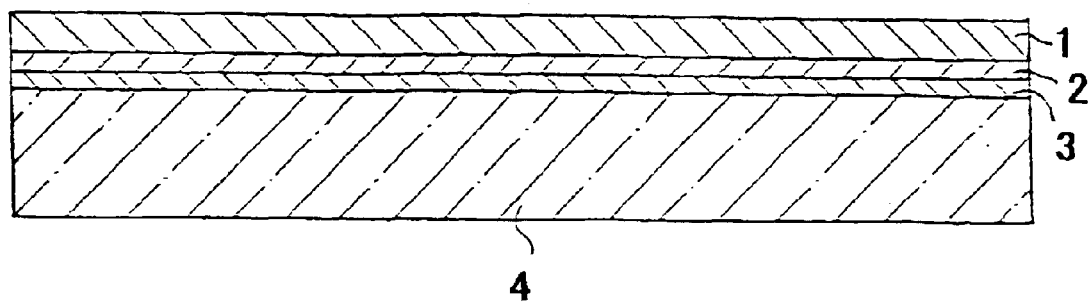
FIG. 1 is a sectional view showing an embodiment of an antireflection film of the present invention.

FIG. 1 is a sectional view of a preferred embodiment of the first aspect of this invention.

In a preferred embodiment of the first aspect of this invention, an antireflection film comprises an organic film 4, a hard coating layer 3, a layer 2 having high index of refraction, and a surface layer 1 made of organic resin having excellent marring resistance and chemical resistance, wherein these layers are laminated on the organic film 4 in that order. Antistatic properties may be given to the antireflection film by doping minute particles of electrically conductive metallic oxide into the hard coating layer 3 or the layer 2 having high index of refraction.

The organic film 4 can be composed of polyester, polyethylene terephthalate(PET), polybutylene terephthalate, polymethyl methacrylate(PMMA), acrylic resin, polycarbonate(PC), polystyrene, cellulose triacetate, polyvinyl alcohol, polyvinyl chloride, polyvinylidene chloride, polyethylene, ethylene-vinyl acetate copolymers, polyurethane, cellophane, or the like. It is preferable to compose the organic film 4 from a transparent film of PET, PC, or PMMA.

A thickness of the organic film 4 is determined suitably by properties that are required for applications of the antireflection film, for example, strength and thinness. Usually, the thickness of the organic film 4 is in a range from 1 $\mu$m to 10 mm.

Layers 1, 2 and 3 are made of synthetic resin. For the synthetic resin, ultraviolet ray curable resin or electron beam curable resin is suitable, and multifunctional acrylic resin is preferable.

It is preferable to dope minute particles of electrically conductive metallic oxides such as ITO, ATO, $Sb_2O_3$, $SbO_2$, $In_2O_3$, $SnO_2$, and ZnO into either the layer 2 having high index of refraction or the hard coating layer 3. It is particularly preferable to have the surface resistance of the hard coating layer 3 at $5\times10^{10}$ $\Omega/\square$ or below in order to give antistatic properties to the antireflection film.

It is suitable to make the index of refraction of the layer 2 having high index of refraction not smaller than 1.64 by doping minute particles of metallic oxide such as ITO(tin indium oxide), ZnO, ZnO doped with Al, $TiO_2$, $SnO_2$, and ZrO.

In case that the layer 2 having high index of refraction is an electrically conductive layer, the minimum surface reflectance of the antireflection film can be reduced to 1.5% or below by increasing the index of refraction of the layer 2 having high index of refraction to 1.64 or above. And the minimum surface reflectance of the antireflection film can be reduced to 1.0% or below by increasing the index of refraction of the layer 2 having high index of refraction to 1.69 or above preferably 1.69–1.82.

In case that the hard coating layer 3 is an electrically conductive layer, the minimum surface reflectance of the antireflection film can be lowered to 1.5% or below by increasing the index of refraction of the hard coating layer 3 to 1.70 or above. And the minimum surface reflectance of the antireflection film can be lowered to 1.0% or below by increasing the index of refraction of the hard coating layer 3 to 1.75 or above.

It is preferable that the visible light transmittance is not smaller than 85% for the hard coating layer 3. It is also preferable that the visible light transmittance is not smaller than 85% both for the layer 2 having high index of refraction and the surface layer 1 made of organic resin having excellent marring resistance and chemical resistance.

It is preferable that the surface layer 1 made of organic resin having excellent marring resistance and chemical resistance includes about 10 to 40 wt. % of minute particles of silica or fluorocarbon polymers for reducing the index of refraction and improving scratch resistance and slipperiness. When acrylic resin is used for a binder (synthetic resin) of the surface layer 1 as described above, cost reduction, enhancement of strength of the film, and improvement of chemical resistance, moisture resistance and heat resistance can be achieved.

It is preferable to have the index of refraction of the surface layer 1 in a range from 1.45 to 1.51. When the index of refraction of the surface layer 1 exceeds 1.51, the property of preventing reflection of the antireflection film becomes poor.

It is preferable to have the thickness of the hard coating layer 3 in a range from 2 to 20 μm, the thickness of the layer 2 having high index of refraction in a range from 75 to 90 nm and the thickness of the surface layer 1 in a range from 85 to 110 nm.

As described above, in order to form layers 1 through 3, it is preferable to coat the unhardened synthetic resin (minute particles of materials listed above are added in need) followed by irradiating ultraviolet rays or electron beams. In this procedure, each of layers 1 through 3 may be coated and hardened one by one, or all three layers may be hardened at one time after all layers are coated.

An explanation of the coating method in concrete terms is as follows: first, coating liquid is prepared by dissolving acrylic monomers in solvent like toluene, and then unhardened synthetic resin is coated with the coating liquid by using a gravure coater. After the coated resin is dried, it is cured by irradiation of ultraviolet rays or electron beams. The advantage of this wet coating method is that films are formed rapidly and uniformly at low cost. By curing films through irradiation of ultraviolet rays, electron beams, or the like after coating, adhesion and hardness of films are improved.

The antireflection film of the present invention ensures high luminous transmittance and good property of preventing pollution when the antireflection film is used for a PDP of office automation apparatus, a front filter of a liquid crystal plate, windows of a vehicle or a building, or the like.

EXAMPLE 1

[A Hard Coating Layer is an Electrically Conductive Layer]

A coating film of acrylic resin for the hard coating layer 3 was formed on a polyester film with the thickness of 100 μm by the wet coating method described above and was dried. Further, by the same method, a coating film for the layer 2 having high index of refraction was formed on the layer 3 and dried, and a coating film for the surface layer 1 was formed on the layer 2 and dried.

Then these coating films were cured by the irradiation of ultraviolet rays. The obtained antireflection film comprised the hard coating layer 3 with the thickness of 5 μm, the layer 2 having high index of refraction with the thickness of 85 nm and the surface layer 1 with the thickness of 95 nm. Compositions of layers 1 through 3 were as follows:

| Composition of the hard coating layer 3 | |
|---|---|
| Multifunctional acrylic resin | 20 parts by weight |
| $Sb_2O_3$ (average particle size: 10 nm.) | 80 parts by weight |
| Composition of the layer 2 having high index of refraction | |
| Multifunctional acrylic resin | 30 parts by weight |
| $ZrO_2$ (average particle size: 30 nm.) | 70 parts by weight |
| Composition of the surface layer 1 | |
| Multifunctional acrylic resin | 70 parts by weight |
| Silica | 30 parts by weight |

The minimum reflectance of the antireflection film was 1.5% and pencil hardness (JIS K5400) of the surface (the surface layer 1) was 2H.

In Example 1, as mentioned above, the hard coating layer 3 included electrically conductive minute particles. The surface resistance of the hard coating layer 3 was $5 \times 10^9$ Ω/□ and the index of refraction of that was 1.65. The indices of refraction of the layer 2 having high index of refraction and the surface layer 1 was 1.75 and 1.50, respectively.

Marring resistance and chemical resistance were measured as follows and the results were listed in Table 1.

Marring resistance was measured by HEIDON test equipment. A sample was weighed by gauze with the load of 0.49 N/cm² and was moved back and forth for 30 times. In Table 1, an open circle means that there was no scratch and a cross means that there were many scratches.

Chemical resistance was measured as follows: gauze soaked with 3% NaOH solution was put on a sample for a certain time (30 minutes) and then the gauze was removed. After being wiped, the sample was examined by the visual observation. In table 1, an open circle means that the color of reflected light from the sample did not change and a cross means that the color of reflected light from the sample changed.

EXAMPLES 2 through 5

[An Hard Coating Layer is an Electrically Conductive Layer]

Antireflection films of Examples 2 through 5 were produced in the same manner as Example 1 except that indices of refraction of layers were set as shown in Table 1 by adjusting the compositions of the layers. The values of minimum reflectance of antireflection films are shown in Table 1.

EXAMPLE 6

[A Layer Having High Index of Refraction is an Electrically Conductive Layer]

A coating film of acrylic resin for the hard coating layer 3 was formed on a polyester film with the thickness of 100 μm by the wet coating method described above and was dried. Further, by the same method, a coating film for the layer 2 having high index of refraction was formed on the layer 3 and dried, and a coating film for the surface layer 1 was formed on the layer 2 and dried.

Then, these coating films were cured by the irradiation of ultraviolet rays. The obtained antireflection film comprised the hard coating layer 3 with the thickness of 5 μm, the layer 2 having high index of refraction with the thickness of 86 nm and the surface layer 1 with the thickness of 95 nm. Compositions of layers 1 through 3 were as follows:

| Composition of the hard coating layer 3 | |
|---|---|
| Multifunctional acrylic resin | 70 parts by weight |
| Silica | 30 parts by weight |
| Composition of the layer 2 having high index of refraction | |
| Multifunctional acrylic resin | 15 parts by weight |
| ITO (average particle size: 10 nm) | 85 parts by weight |
| Composition of the surface layer 1 | |
| Multifunctionul acrylic resin | 70 parts by weight |
| Silica | 30 parts by weight |

The minimum reflectance of the antireflection film was 1.5% and pencil hardness (JIS K5400) of the surface (the surface layer 1) was 2H.

In Example 6, the layer 2 having high index of refraction included electrically conductive minute particles. The surface resistance of the hard coating layer 3 was $5.0 \times 10^9$ Ω/□ and the index of refraction of that was 1.50. The indices of refraction of the layer 2 having high index of refraction and the surface layer 1 were 1.65 and 1.50, respectively.

EXAMPLES 7 and 8
[A Layer Having High Index of Refraction is an Electrically Conductive Layer]

Antireflection films of Examples 7 and 8 were produced in the same manner as Example 3 except that the indices of refraction of layers were set as shown in Table 1 by adjusting the compositions of the layers. The values of minimum reflectance of antireflection films are shown in Table 1.

Comparative Examples 1 and 2
[A Layer Having High Index of Refraction is an Electrically Conductive Layer]

Comparative Example 1 was produced in the same manner as Example 6 except that the layer 2 having high index of redaction was composed of 25 parts by weight of multifunctional acrylate and 75 parts by weight of ITO (average particle size: 10 nm), and the surface layer 1 was composed of silicone resin ("ELCOM-P" produced by Syokubai Kasei Co., Ltd.).

Comparative Example 2 was produced in the same manner as Example 6 except that the layer 2 having high index of refraction was composed of 35 parts by weight of multifunctional acrylate and 65 parts by weight of ITO (average particle size: 10 nm), and the surface layer 1 was composed of fluorocarbon polymers ("JN 7215" produced by JSR Co., Ltd.).

that order. The layer 12 has a high index of refraction by containing minute particles of one or more kinds of metallic oxides having high indices of refraction chosen from $ZrO_2$, $TiO_2$, NbO, ITO, ATO, $SbO_2$, $In_2O_3$, $SnO_2$, and ZnO.

The organic film 14 can be composed of polyester, polyethylene terephthalate(PET), polybutylene terephthalate, polymethyl methacrylate(PMA), acrylic resin, polycarbonate(PC), polystyrene, triacetate, polyvinyl alcohol, polyvinyl chloride, polyvinylidene chloride, polyethylene, ethylene-vinyl acetate copolymers, polyurethane, cellophane, or the like. It is preferable to compose the organic film 14 from a transparent film of PET, PC, or PMMA.

The thickness of the organic film 14 is determined suitably by properties that are required for applications of the antireflection film, for example, strength and thinness. Usually, the thickness of the organic film 14 is in a range from 1 μm to 10 nm.

Layers 11, 12 and 13 are made of ultraviolet ray curable resin or electron beam curable resin. All the layers 11, 12 and 13 are not necessarily made of the same synthetic resin. Improvements of adhesion are brought when the same synthetic resin is used for all the layers 11, 12 and 13. For a binder resin of the layer 12 having high index of refraction, acrylic resin is suitable, but not limitative thereto.

Minute particles of one or more kinds of metallic oxides having high indices of refraction chosen from $ZrO_2$, $TiO_2$, NbO, ITO, ATO, $SbO_2$, $In_2O_3$, $SnO_2$ and ZnO are included in the layer 12 having high index of refraction. It is preferable that sizes of these metallic oxide particles are preferably not greater than 0.1 μm and the content of these metallic oxide particles in the layer 12 is not smaller than 70 vol. %. When the content is smaller than 70 vol. %, a precursory

TABLE 1

| | | Example | | | | | | | | Comparative Example | |
|---|---|---|---|---|---|---|---|---|---|---|---|
| No. | | 1 | 2 | 3 | 4 | 5 | 6 | 7 | 8 | 1 | 2 |
| surface layer | index of refraction | 1.50 | 1.50 | 1.50 | 1.50 | 1.50 | 1.50 | 1.50 | 1.50 | 1.48 | 1.41 |
| | thickness (nm) | 95 | 95 | 95 | 95 | 95 | 95 | 95 | 95 | 95 | 98 |
| layer having high index of refraction | index of refraction | 1.70 | 1.75 | 1.67 | 1.67 | 1.67 | 1.65 | 1.73 | 1.61 | 1.62 | 1.60 |
| | thickness (nm) | 85 | 82 | 86 | 86 | 86 | 86 | 83 | 89 | 89 | 91 |
| hard coating layer | index of refraction | 1.65 | 1.65 | 1.65 | 1.63 | 1.60 | 1.50 | 1.50 | 1.50 | 1.50 | 1.50 |
| | thickness (μm) | 5 | 5 | 5 | 5 | 5 | 5 | 5 | 5 | 5 | 5 |
| minimamu refrectance (%) | | 1.5 | 0.7 | 1.9 | 1.9 | 2.0 | 1.5 | 0.7 | 2.0 | 1.5 | 1.5 |
| marring resistance | | ○ | ○ | ○ | ○ | ○ | ○ | ○ | ○ | ○ | x |
| chemical resistance | | ○ | ○ | ○ | ○ | ○ | ○ | ○ | ○ | x | ○ |

As detailed above, the first aspect of the present invention makes possible to provide an antireflection that has excellent property of preventing reflection and pollution, excellent marring resistance and chemical resistance, and yet that is produced at low cost.

Figure 2:
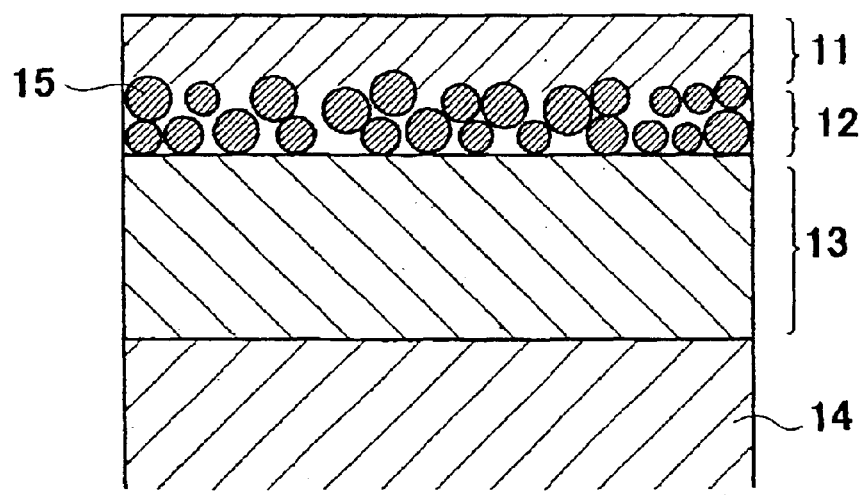
FIG. 2 is a sectional view showing another embodiment of an antireflection film of the present invention.

FIG. 2 is a sectional view of a preferred embodiment of the second aspect of this invention.

In a preferred embodiment of the second aspect of this invention, an antireflection film comprises an organic film 14, a hard coating layer 13, a layer 12 having high index of refraction, and a layer 11 having low index of refraction, wherein these layers are laminated on the organic film 14 in layer of the layer 12 hardly becomes porous so that the penetration of material (synthetic resin) to make the layer 11 having low index of refraction into the precursory layer becomes insufficient.

It is preferable to add electrically conductive metallic oxide particles, such as ITO, ATO, $Sb_2O_3$, $SbO_2$, $In_2O_3$, $SnO_2$ and ZnO, to the layer 12 having high index of refraction. It is strongly recommended to give antistatic properties to the antireflection film by decreasing surface resistance of the hard coating layer 13 to $5 \times 10^{10}$ Ω/□ or below. In this case these metallic oxide particles are distributed in the very thin layer so that the amount of inorganic material can be saved compared with the case in which a hard coating layer has antistatic properties. It leads to a reduction of the cost.

The minimum surface reflectance of the antireflection film can be lowered to 1.5% or below by increasing the index of refraction of the layer 12 having high index of refraction to 1.64 or more. The minimum surface reflectance of the antireflection film can be lowered to 1.0% or below by increasing the index of refraction of the layer 12 to 1.69 or more.

It is preferable that the layer 11 having low index of refraction includes minute particles of silica or fluorocarbon polymers in order to reduce the index of refraction and to improve scratch resistance and slipperiness. When acrylic resin is used for a binder (synthetic resin) of the layer 11 having low index of refraction, strength and chemical resistance of the film can be improved, and yet the cost can be reduced.

It is preferable that the index of refraction of the layer 11 having low index of refraction is not greater than 1.51, particularly in a range from 1.45 to 1.51. When the index of refraction of the layer 11 exceeds 1.51, the property of preventing reflection of the antireflection film becomes poor.

It is preferable that the thickness of the hard coating layer 13 is in a range from 2 to 20 μm, the thickness of the layer 12 having high index of refraction is in a range from 75 to 90 nm, and the thickness of the layer 11 having low index of refraction is in a range from 85 to 110 nm. Acrylic resin is suitable for a binder resin of the hard coating layer 13.

As described above, in order to form layers 11 through 13, it is preferable to coat the unhardened synthetic resin (minute particles of materials listed above are added in need) followed by irradiating ultraviolet rays or electron beams. In this procedure, each of layers 11 through 13 may be coated and hardened one by one, or all three layers may be hardened at one time after all layers are coated.

In order to form the layer 12 having high index of refraction and the layer 11 having low index of refraction, the following procedure is strongly recommended: first, a porous precursory layer of the layer 12 is formed, and then liquid material to make the layer 11 is coated on the precursory layer so that a part of liquid material to make the layer 11 penetrates into the precursory layer, and finally liquid material to make the layer 11 is hardened.

When the layers 11 and 12 are formed as described above, it is possible to have strong adhesion between the layer 11 and the layer 12. It is desirable that the void fraction of the precursory layer is not smaller than 10 vol. %. When the void fraction is less than 10 vol. %, the amount of liquid material to make the layer 11 penetrated into the precursory layer becomes smaller so that adhesion between the layer 11 and the layer 12 becomes insufficient. Since the precursory layer of the layer 12 is porous, the index of refraction of the precursory layer is not greater than 1.64. It is preferable for the layer 12 to have the index of refraction, 1.64 or higher, if possible 1.69 or higher by having liquid material (synthetic resin) penetrated into the precursory layer.

An explanation of the coating method in concrete terms is as follows: first, coating liquid is prepared by dissolving acrylic monomers in solvent like toluene, and then unhardened synthetic resin is coated with the coating liquid by using a gravure coater. After the coated resin is dried, it is cured by irradiation of ultraviolet rays or electron beams. The advantage of this wet coating method is that films are formed rapidly and uniformly at low cost. By curing films through irradiation of ultraviolet rays, electron beams, or the like after coating, adhesion and hardness of films are improved.

The antireflection film of the present invention ensures high luminous transmittance and strong adhesion when the antireflection film is used for a PDP of office automation apparatus, a front filter of a liquid crystal plate, windows of a vehicle or a building, or the like.

As detailed above, the second aspect of the present invention makes possible to provide a coating type of antireflection film that has excellent property of preventing reflection, and considerably improved adhesion among layers and chemical resistance. Furthermore, by using an electrically conductive inorganic material, the film can have antistatic/electromagnetic wave shielding properties.

What is claimed is:

1. An antireflection film comprising:

an organic film, a hard coating layer coated on the organic film, a first layer having an index of refraction and coated on the hard coating layer, said first layer being formed of a synthetic resin having pores therein and metallic oxide particles contained in the synthetic resin, said metallic oxide being at least one selected from the group consisting of $ZrO_2$, $TiO_2$, NbO, ITO, ATO, $SbO_2$, $In_2O_3$, $SnO_2$ and ZnO, and said synthetic resin being ultraviolet ray curable resin or electron beam curable resin, and a second layer having an index of refraction lower than that of the first layer and coated on the first layer, said second layer partly entering into the pores to firmly bond to the first layer through the pores, wherein said first layer comprises a porous precursory layer having an index of refraction not greater than 1.64 and said second layer comprises a liquid material coated on the porous precursory layer made integral with pores of the porous precursory layer so that when the first and second layers are integrally formed, the first layer has the index of refraction not smaller than 1.64.

2. An antireflection film as claimed in claim 1, wherein an amount of said metallic oxide particles contained in said first layer is not smaller than 70 wt. %.

3. An antireflection film as claimed in claim 1, wherein sizes of said metallic oxide particles are not greater than 0.1 μm.

4. An antireflection film as claimed in claim 1, wherein said synthetic resin is acrylic resin.

5. An antireflection film as claimed in claim 1, wherein an amount of said liquid material entering into said first layer is not smaller than 10 vol. %.

6. An antireflection film as claimed in claim 1, wherein said precursory layer becomes the first layer including air after a solvent of the precursory layer is dried or crosslinked.

7. An antireflection film as claimed in claim 6, wherein void fraction of said precursory layer is not smaller than 10 vol. %.

8. An antireflection film as claimed in claim 1, wherein the index of refraction of the second layer is in a range from 1.45 to 1.51.

9. An antireflection film as claimed in claim 1, wherein said second layer includes particles which provide marring resistance and lower coefficients of friction.

10. An antireflection film as claimed in claim 9, wherein said particles in the second layer are composed of silica or fluorocarbon polymers.

* * * * *